(12) United States Patent
Williamson (10) Patent No.: US 10,429,644 B2
(45) Date of Patent: Oct. 1, 2019

(54) DATA PROCESSING

(71) Applicant: ARM Ltd, Cambridge (GB)

(72) Inventor: Paul Williamson, Cambridge (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 15/656,244

(22) Filed: Jul. 21, 2017

(65) Prior Publication Data

US 2018/0024362 A1 Jan. 25, 2018

(30) Foreign Application Priority Data

Jul. 22, 2016 (GB) .................................. 1612694.8

(51) Int. Cl.

| | | |
|---|---|---|
| *G02B 27/01* | (2006.01) | |
| *G06T 19/00* | (2011.01) | |
| *G06T 11/60* | (2006.01) | |
| *G01S 1/20* | (2006.01) | |
| *G01S 5/10* | (2006.01) | |
| *G01S 5/02* | (2010.01) | |
| *G01S 5/12* | (2006.01) | |
| *G01S 5/14* | (2006.01) | |

(52) U.S. Cl.
CPC .............. *G02B 27/017* (2013.01); *G01S 1/20* (2013.01); *G01S 5/02* (2013.01); *G01S 5/10* (2013.01); *G01S 5/12* (2013.01); *G01S 5/14* (2013.01); *G06T 11/60* (2013.01); *G06T 19/006* (2013.01); *G02B 2027/014* (2013.01); *G02B 2027/0147* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 7,467,356 | B2* | 12/2008 | Gettman | G06F 3/04815 |
| | | | | 707/E17.111 |
| 9,092,898 | B1* | 7/2015 | Fraccaroli | G06T 19/006 |
| 2012/0268563 | A1* | 10/2012 | Chou | A61H 3/061 |
| | | | | 348/46 |
| 2013/0158821 | A1* | 6/2013 | Ricci | H04W 4/90 |
| | | | | 701/51 |

(Continued)

FOREIGN PATENT DOCUMENTS

WO 2013154476 A1 10/2013

OTHER PUBLICATIONS

Dongsik Jo, et al. "In-situ AR Manuals for IoT Appliances", 2016 IEEE International Conference on Consumer Electronics (ICCE) on Jan. 7-11, 2016 pp. 409-410 ISSN: 2158-4001.

(Continued)

*Primary Examiner* — Ryan M Gray
(74) *Attorney, Agent, or Firm* — EIP US LLP (57) ABSTRACT

Measures, including methods, systems, and non-transitory computer-readable storage media, for processing data for an augmented reality environment. An augmented reality user device receives at least one signal from a radio frequency beacon at at least one radio frequency receiver of the augmented reality user device. A spatial resolution operation is performed in relation to the at least one received signal to determine a location of the radio frequency beacon. A virtual object is rendered in an augmented reality environment on the augmented reality user device at least on the basis of the determined location.

18 Claims, 3 Drawing Sheets

(56) References Cited

U.S. PATENT DOCUMENTS

| | | |
|---|---|---|
| 2013/0297460 A1* | 11/2013 | Spivack ............ G06Q 30/0643 |
| | | 705/27.2 |
| 2014/0036065 A1 | 2/2014 | Oakley et al. |
| 2014/0055488 A1 | 2/2014 | Masters |
| 2014/0063061 A1* | 3/2014 | Reitan .................... G09G 3/003 |
| | | 345/633 |
| 2015/0030159 A1* | 1/2015 | Ozcan ................ G01C 21/3629 |
| | | 381/17 |
| 2015/0117664 A1* | 4/2015 | Mossner ............. H04R 1/1091 |
| | | 381/74 |
| 2015/0348377 A1* | 12/2015 | Kauffmann .............. G08B 3/10 |
| | | 340/384.5 |
| 2016/0005233 A1 | 1/2016 | Fraccaroli et al. |
| 2016/0140868 A1* | 5/2016 | Lovett ................ G09B 19/0053 |
| | | 434/118 |
| 2016/0238692 A1* | 8/2016 | Hill ...................... G02B 27/017 |
| 2016/0313902 A1* | 10/2016 | Hill ..................... G06F 3/04847 |
| 2018/0158248 A1* | 6/2018 | Spivack ............. G06Q 30/0643 |

OTHER PUBLICATIONS

United Kingdom Search Report dated Feb. 1, 2017 for related Application GB1612694.8 filed Jul. 22, 2016.

\* cited by examiner

DATA PROCESSING

CROSS-REFERENCE TO RELATED APPLICATIONS

This application claims the benefit under 35 U.S.C. § 119(a) and 37 CFR § 1.55 to United Kingdom patent application no. GB 1612694.8, filed on Jul. 22, 2016, the entire content of which is incorporated herein by reference.

BACKGROUND

Field of the Disclosure

The present disclosure relates to data processing. In particular, but not exclusively, the present disclosure relates to processing data in relation to augmented reality and/or virtual reality environments.

Description of the Related Technology

Processing data in relation to augmented reality or virtual reality environments involves determining where to position (or 'anchor') virtual objects. In an augmented reality environment, this typically involves determining locations of where to render one or more virtual objects in relation to one or more real objects in the physical environment, whereas in a virtual reality environment, this typically involves determining locations of where to render one or more virtual objects in relation to one or other virtual objects in the simulated environment.

Processing data in relation to augmented reality or virtual reality environments may involve rendering one or more virtual objects on an augmented or virtual reality user device such as a headset. Rendering the positioning of virtual objects more accurately can lead to an improved user experience.

SUMMARY

According to a first embodiment, there is provided a method of processing data for an augmented reality environment. The method includes, at an augmented reality user device: receiving at least one signal from a radio frequency beacon at at least one radio frequency receiver of the augmented reality user device, performing a spatial resolution operation in relation to the at least one received signal to determine a location of the radio frequency beacon, and rendering a virtual object in an augmented reality environment on the augmented reality user device at least on the basis of the determined location. The rendering includes rendering one or more audio features of the virtual object in relation to the determined location in the augmented reality environment.

According to a second embodiment, there is provided system for use in processing data for an augmented reality environment. The system includes at least one memory including computer program code, and at least one processor in data communication with the at least one memory. The at least one processor is configured to: receive at least one signal from a radio frequency beacon at at least one radio frequency receiver of the augmented reality user device, perform a spatial resolution operation in relation to the at least one received signal to determine a location of the radio frequency beacon, and render one or more audio features of a virtual object in an augmented reality environment on the augmented reality user device at least on the basis of the determined location in the augmented reality environment.

According to a third embodiment, there is provided a non-transitory computer-readable storage medium comprising computer-executable instructions which, when executed by a processor, cause an augmented reality device to perform a method. The method includes: receiving at least one signal from a radio frequency beacon at at least one radio frequency receiver of the augmented reality user device, performing a spatial resolution operation in relation to the at least one received signal to determine a location of the radio frequency beacon, and rendering a virtual object in an augmented reality environment on the augmented reality user device at least on the basis of the determined location. The rendering includes rendering one or more audio features of the virtual object in relation to the determined location in the augmented reality environment.

Further features and advantages of embodiments will become apparent from the following description of preferred embodiments, given by way of example only, which is made with reference to the accompanying drawings.

DETAILED DESCRIPTION

The present disclosure provides measures for the anchoring and/or positioning of one or more virtual objects. The present disclosure enables a virtual reality or augmented reality user device such as a headset to convey (for example display) information to a user in the correct location and orientation.

Embodiments employ radio beacons (for example using the Bluetooth™ low energy standard) to advertise the location and/or availability of virtual reality/augmented reality objects that are available to be rendered (for example visually and/or audibly) for the wearer of a virtual reality or augmented reality headset or other simulated reality user device. In some embodiments, a radio frequency beacon is intentionally conspicuous and thus visible to users at a particular location. In some embodiments, a radio frequency beacon is an intentionally inconspicuous device, for example embedded 'invisibly' in one or more other objects.

Some embodiments use a combination of the received signal strength and the angle of arrival of one or more radio frequency signals to resolve the spatial location of one or more virtual objects within the relevant environment. These embodiments differ from an approach in which the mere presence or absence of a beacon is detected.

In some embodiments, the radio beacon data payload of a radio signal includes information on how to resolve the information to be rendered, for example a web or other network address where a virtual object description can be found. In other embodiments, the beacon data payload includes real time information from the local environment that can be used to customize or augment a rendered object based on local information that a radio beacon is collecting and advertising.

Figure 1:
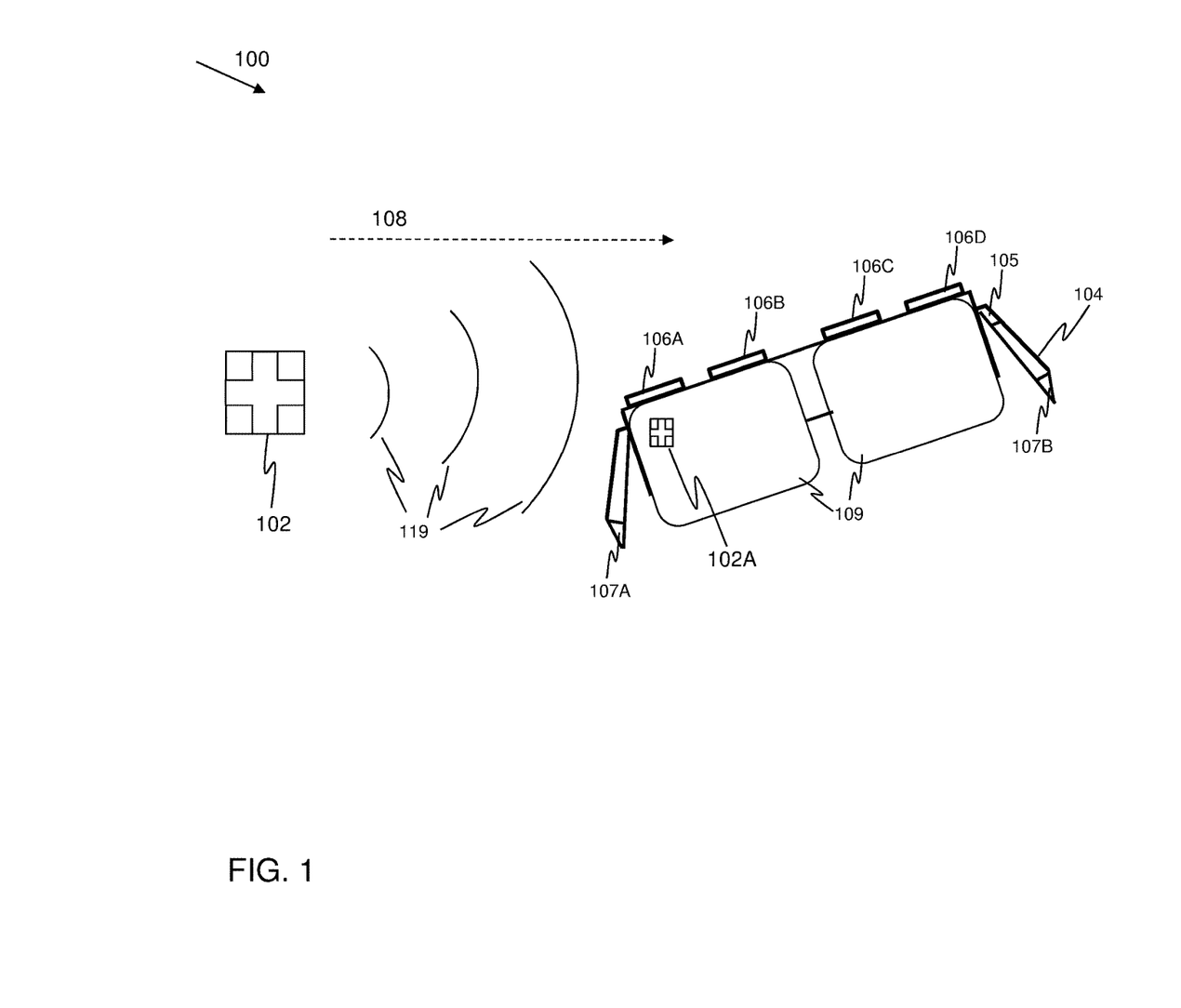
FIG. 1 shows an example system in which embodiments can be employed.

FIG. 1 shows an example system 100 in which embodiments can be employed. System 100 comprises an augmented reality user device 104 and a radio frequency beacon 102.

Examples of augmented reality user devices include, but are not limited to, mobile computing devices (for example smartphones and tablet computers), headsets and headphones (for example in-ear, on-ear or over-ear).

In the example embodiments of FIG. 1, augmented reality user device 104 comprises a headset which can be worn by a user (not shown). Augmented reality user device 104 comprises at least one radio frequency receiver. In this example, augmented reality user device 104 has four radio frequency receivers 106A, 106B, 106C, 106D, but in other examples could have a different number of radio frequency receivers. In some examples, the augmented reality user device 104 has a single radio frequency receiver.

Augmented reality user device 104 comprises one or more processors and one or more memories 105 which are capable of performing various data processing operations including data processing for graphical, video and audio rendering, image processing, gaze-tracking and spatial resolution functionality. Element 105 may comprise one or more graphics processing units (GPUs).

In the example embodiments of FIG. 1, augmented reality user device 104 comprises a graphical user interface 109 capable of outputting graphical and/or video signals rendered by one or more processors 105. Graphical user interface 109 also enables user input from a user of augmented reality user device 104, for example via eye-tracking (or 'gaze-tracking') functionality of one or more of a user's eyes and/or via voice recognition from one or more microphones (not shown). In the example of FIG. 1, graphical user interface 109 is shown as two lens-shaped portions, but in other examples could comprise a single portion or part(s) thereof. In some examples, the augmented reality user device 104 does not comprise such a graphical user interface 109, for example where the augmented reality user device 104 renders virtual objects audibly but not visually, as will be described in more detail below.

Augmented reality user device 104 comprises one or more audio channel loudspeakers 107A, 107B capable of outputting audio signals rendered by one or more processors 105. Augmented reality user device 104 may comprise single or multiple audio channel pickup functionality via one or more microphones (not shown).

Augmented reality user device 104 comprises one or more electrical power sources (not shown), such as batteries or cells, for providing power to components of augmented reality user device 104.

Radio frequency beacon 102 comprises a radio frequency transmitter which outputs radio frequency signals. In the example of FIG. 1, a radio frequency signal 119 is depicted as a number of radio frequency waves propagating in a direction 108 towards augmented reality user device 104 where it is received by one or more of radio frequency receivers 106A, 106B, 106C, 106D. Radio frequency signal 119 may include some payload data, for example an identifier for radio frequency beacon 102 or one or more network addresses or suchlike. In alternative embodiments, radio frequency beacon 102 comprises multiple radio frequency transmitters.

According to embodiments, the radio frequency transmitter(s) of radio frequency beacon 102 are configured to transmit (and possibly also receive) radio frequency signals according to one or more transmission protocols, for example a Bluetooth low energy (BLE) protocol, a Radio-Frequency Identification (RFID) protocol, or a WiFi (IEEE 802.11x) protocol. In embodiments, the at least one signal received at augmented reality user device 104 is received via one or more of a BLE protocol, an RFID protocol, and a WiFi protocol.

Embodiments comprise measures, for example methods, systems, processors and computer programs, for use in processing data for an augmented reality environment.

At least one signal 119 is received from a radio frequency beacon 102 at at least one radio frequency receiver 106A, 106B, 106C, 106D of augmented reality user device 104. Augmented reality user device 104 performs a spatial resolution operation in relation to the at least one received signal 119 to determine a location of radio frequency beacon 102. Augmented reality user device 104 then renders a virtual object 102A in an augmented reality environment on the augmented reality user device at least on the basis of the determined location. The virtual object 102A may or may not be rendered in the same location as that of the radio frequency beacon 102.

In the example of FIG. 1, the virtual object which is rendered is depicted as a visual object 102A on graphical user interface 109 of augmented reality user device 104. As such, one or more visual features of the virtual object can be rendered in relation to a determined location in an augmented reality environment.

Rendering may, alternatively or additionally, comprise rendering one or more audio features of the virtual object in relation to a determined location in an augmented reality environment. As such, rendering of one or more audio features may be performed in addition to or instead of rendering of one or more visual features of a virtual object.

In embodiments, augmented reality user device 104 comprises a plurality of audio channel loudspeakers and rendering the one or more audio features comprises outputting a plurality of audio signals comprising differing spatial information via the plurality of audio channel loudspeakers. By use of such embodiments, a user of augmented reality user device 104 is able to determine a relative orientation of the virtual object by spatial audio perception.

An example use of the above audio rendering embodiments may be in a museum where different exhibits each have associated radio frequency beacons and associated audio playbacks. The audio playback for a given exhibit/beacon may for example include a relevant audio reading describing what the given exhibit is about. By use of embodiments, a user is able to tell by stereo (or multichannel) perception which direction the appropriate exhibit is in and turn their head and/or move their body accordingly towards/around the given exhibit. Furthermore, by use of such embodiments, audible information associated with an object may be provided to a user without the object itself having a loudspeaker to convey the audible information to the user. This may be especially effective in environments such as museums where audible information from multiple exhibits could be distracting and/or confusing for the user and/or other users. Such embodiments could, for example, enable audible information to be tailored to individual users, for example by enabling the user to listen to the audible information in a preferred language, which may not be possible where a loudspeaker is used. Such embodiments could also be combined with rendering of one or more visual features, for example overlaid over a visible part of the given exhibit on graphical user display 109.

The radio beacon and/or associated real object may have a visual feature which enables augmented reality user device 104 to locate the object within the field of view and anchor the correct object to that virtual beacon (e.g. a target symbol or QR code feature).

In some embodiments, the rendering comprises rendering one or more visual features of the virtual object in relation to the determined location in the augmented reality environment.

In some embodiments, the one or more visual features are rendered in association with a real object. In some embodiments, the one or more rendered visual features direct the user to the location of the real object; in some such examples, the one or more rendered visual features may comprise an arrow pointing towards a real object. A real object referred to herein comprises a physical, tangible, and/or non-virtual object.

According to one embodiment, the real object has a given visual feature, and in response to detection of the given visual feature in a field of view of augmented reality user device 104, the virtual object is rendered in the augmented reality environment further on the basis of the location of the given visual feature in the field of view of augmented reality user device 104. The given feature therefore acts as a form of calibration between detected visual data and rendered data which can assist in anchoring (or 'locking') positioning of the virtual object more accurately. In embodiments, the given feature comprises one or more of a given target symbol (for example of a known shape and/or dimension), a bar code, and a matrix bar code (for example a QR code).

Figure 2:
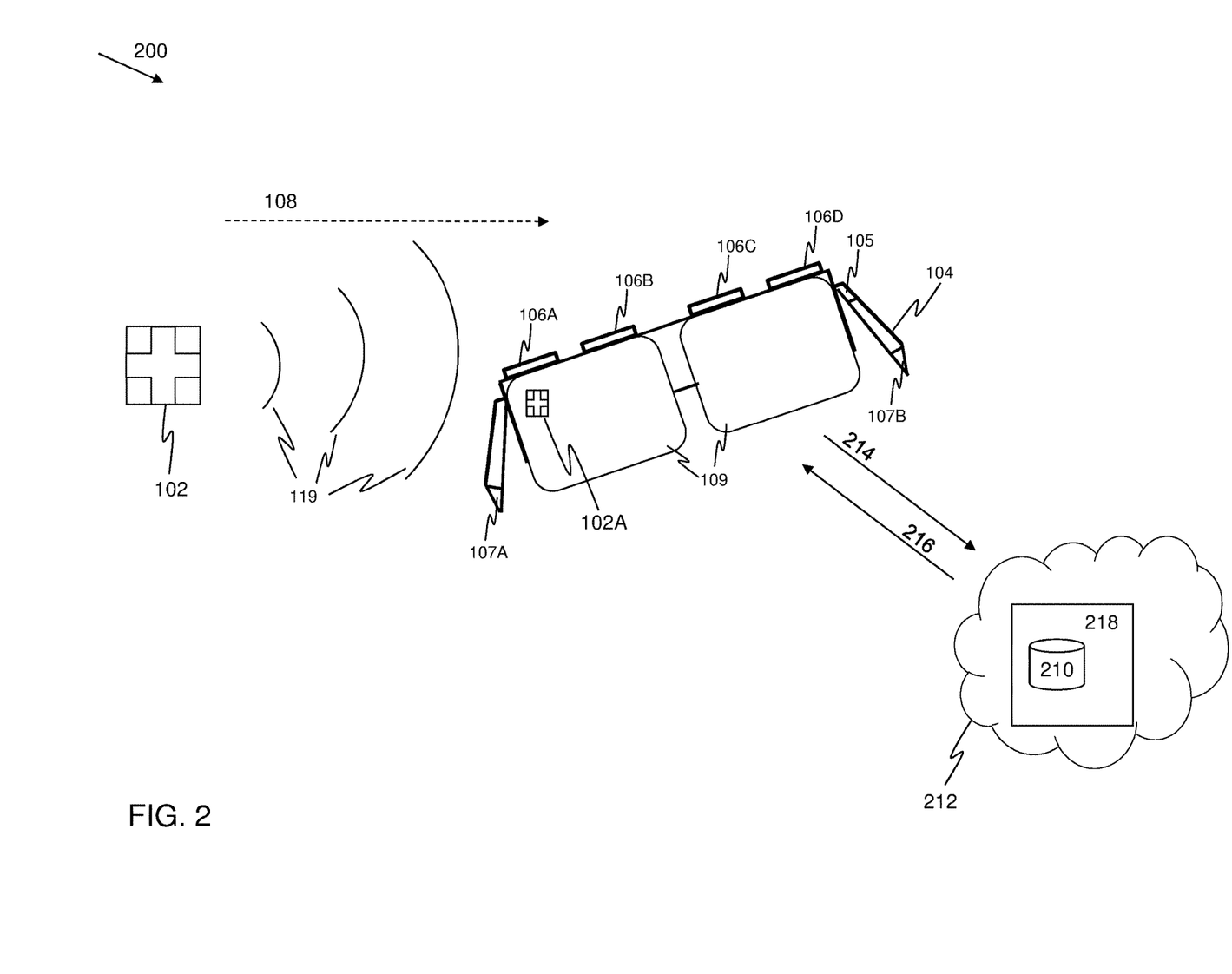
FIG. 2 shows an example system in which embodiments can be employed.

FIG. 2 shows an example system 200 in which embodiments can be employed. System 200 comprises a number of elements in common with system 100 of FIG. 1 where similar elements are similarly numbered.

In system 200, augmented reality user device 104 is capable of communicating with one or more devices in network 212, for example server 218. Server 218 hosts a database 210. Communication to/from augmented reality user device 104 and devices in network 212 may be conducted via one or more transceivers (not shown), whose function may or may not overlap at least partially with one or more of radio frequency receivers 106A, 106A, 106C, 106D.

In some embodiments, communication to/from augmented reality user device 104 and devices in network 212 may not be direct communication. For example, the communication may be from augmented reality user device 104 to a smartphone which itself has a modem with access to network 212. Another example could involve a vehicle with a heads-up display that accesses the internet via an on-board modem.

In embodiments, data comprised in the received at least one signal 119 is used by augmented reality user device 104 to obtain rendering information for virtual object 102A; in such embodiments, the rendering of virtual object 102A is performed on the basis of the obtained rendering information.

In one example, the data comprised in the received at least one signal 119 comprises an identifier for radio frequency beacon 102 and the obtaining comprises performing, via a network, a lookup in a radio frequency beacon database (for example database 210) on the basis of the identifier for the radio frequency beacon. Augmented reality user device 104 may be configured to recognize identifiers for radio frequency beacons such as radio frequency beacon 102 in signals it receives. Augmented reality user device 104 may also be configured to know where to perform lookup of recognized beacon identifiers in a radio beacon database (in this example, database 210). In alternative embodiments, a lookup in a more general database is performed, i.e. a database which contains other information in addition to information about radio frequency beacons.

In another example, the data comprised in the received at least one signal 119 comprises a network address (for example a uniform resource locator (URL)) and the obtaining comprises accessing the rendering information at the network address (for example the URL may point to server 218 or directly to database 210).

In some embodiments, radio frequency beacon 102 is co-located with a real object and/or is integral to a real object. In embodiments, the one or more rendered visual features comprise a graphical user interface for interacting with the real object via user input on the augmented reality user device. In embodiments, augmented reality user device 104 renders a graphical user interface associated with a real object as an overlay over or near to the real object. The graphical user interface may be rendered as a two dimensional graphical user interface or a three dimensional graphical user interface. In some embodiments, the graphical user interface is operable to change one or more settings of the real object via user input on the augmented reality user device.

In embodiments, augmented reality user device 104 can indicate to the user the location and availability of services available via an object/device and radio beacon pairing in a graphical user interface display of augmented reality user device 104. A user of augmented reality user device 104 can select the object using the graphical user interface on augmented reality user device 104. Augmented reality user device 104 then resolves a web address provided by the beacon and retrieves three dimensional modelling information for rendering the user interface from the web address. Augmented reality user device 104 then renders the graphical user interface (for example in three dimensions) in the location determined from the received radio signal. The beacon 102 may also be available to connect so that the virtual reality or augmented reality device user can interact with the device and change settings or suchlike.

As an alternative to, or in addition to, the augmented reality user device 104 rending a graphical user interface for interacting with the real object, the augmented reality user device 104 can render a non-graphical user interface, for example a voice (or 'sonic') user interface. Using the voice user interface, the user can interact with the object by speaking into a microphone of the augmented reality user device 104 and by listening to output of an audio output component of the augmented reality user device 104.

Figure 3:
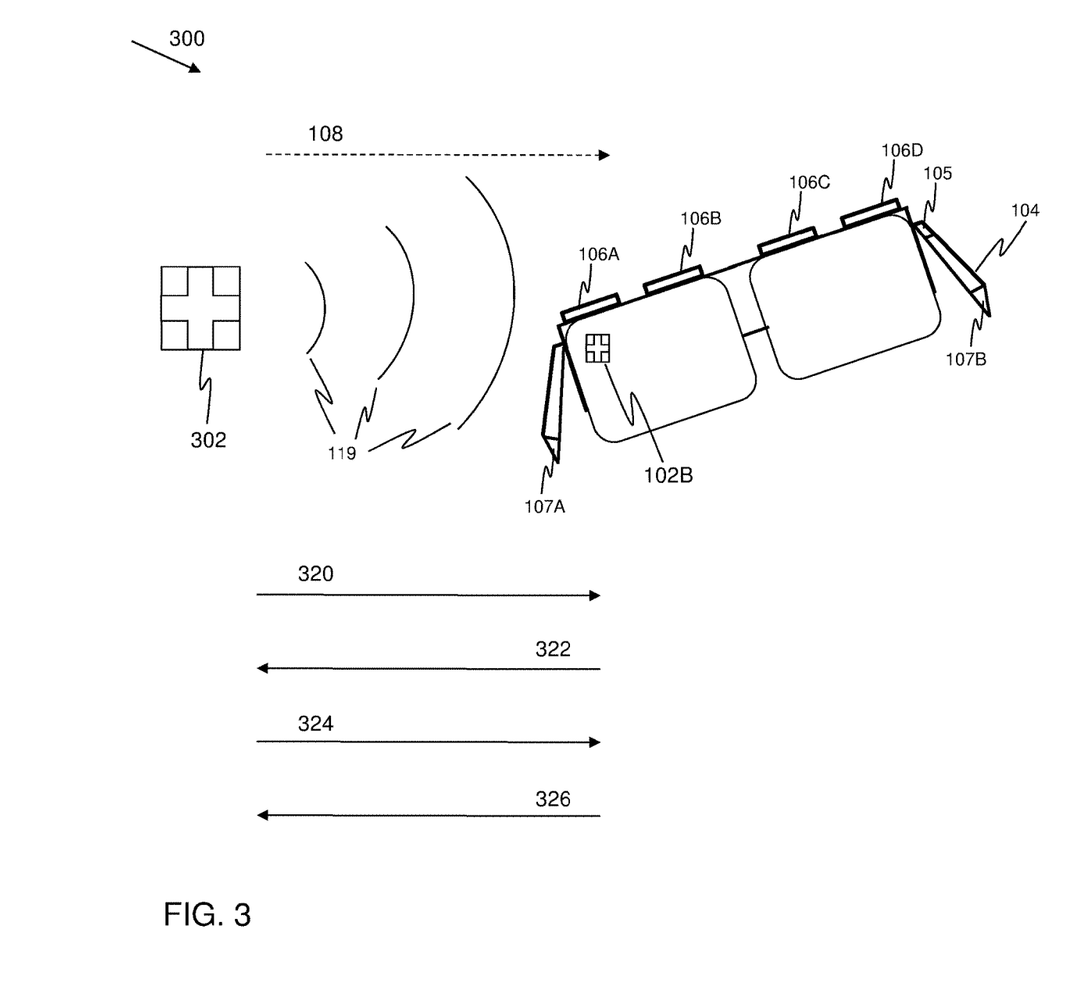
FIG. 3 shows an example system in which embodiments can be employed.

FIG. 3 depicts an example system 300 in which embodiments can be employed. System 300 comprises a number of elements in common with system 100 of FIG. 1 and system 200 of FIG. 2 where similar elements are similarly numbered.

System 300 relates to a consumer/smart home scenario comprising a real object in the form of a thermostat 302 on a wall having an in-built Bluetooth™ low energy (BLE) radio transceiver (not shown). Thermostat 302 measures the temperature of the room and has a target temperature that can be set by users. Thermostat 302 advertises a URL where the user's augmented reality user device 104 (in this example a headset) can find the information to render a visual user interface in the headset. Thermostat may also advertise other parameters such as its ability to be connected to, for example as shown by message/signal element 320. If the thermostat is within the field of view of the headset, a visual anchor on the thermostat may be used by the headset to more precisely locate and orient the rendered object.

A user of augmented reality user device 104 may choose to connect with thermostat 320 via suitable user input on an overlaid graphical user interface 102B (and/or via a voice user interface) for thermostat 302 on augmented reality user device 104. Augmented reality user device 104 then sends a connection request to thermostat 302 for example via a radio link, as shown by message/signal element 322. In some examples, the connection request comprises a request to connect to the thermostat 302 over a different type of connection from that over which message/signal elements 320 and 322 were communicated. For example, the different type of connection could have a higher bandwidth than that over which message/signal elements 320 and 322 were communicated.

If thermostat accepts the connection request it confirms such and a communication connection is established. Thermostat then sends information relating to one or more of its current settings to augmented reality user device 104, as shown by message/signal element 324. One such current setting may for example include a target temperature for the room. When using the graphical user interface for thermostat 302, the user might wish to update one or more settings of the thermostat device. The user may for example opt to change the target temperature and, upon entering suitable user input via the graphical user interface rendered on augmented reality user device 104 (and/or via a voice user interface), a request/command to change the target temperature is transmitted to thermostat 302, as shown by message/signal element 326.

The permissions to modify the settings of thermostat device 302 may for example be managed through the distribution of keys from a web address provided by the advertising beacon in its transmitted radio signal(s).

In embodiments, the at least one signal received by augmented reality user device 104 comprises real-time information from the local environment of the real object. In the thermostat example, such real-time information might be a measured room temperature and/or a target room temperature. The real-time information may be conveyed to the user visually and/or audibly.

Embodiments comprise rendering the virtual object in the augmented reality environment further on the basis of the real-time information from the local environment of the real object. In the thermostat example, this could involve updating a graphical user interface overlaid over the thermostat to indicate the current measured room temperature and/or target room temperature.

In embodiments, augmented reality user device 104 comprises geographical location service functionality. In such embodiments, rendering of the virtual object in the augmented reality environment is carried out further on the basis of geographical location information obtained via the geographical location service functionality of augmented reality user device 104.

In embodiments, the location of a virtual object may be further supported by the use of micro-electro-mechanical system (MEMS) sensors within the augmented reality user device. In embodiments, augmented reality user device 104 comprises one or more micro-electro-mechanical system sensors. In such embodiments, rendering the virtual object in the augmented reality environment is carried out further on the basis of information obtained via the one or more micro-electro-mechanical system sensors of augmented reality user device 104.

Some embodiments employ indoor and/or outdoor location services such as Global Positioning System (GPS) or resolution of a WiFi service set identifier (SSID) to further enhance the location determination and resulting rendering.

In embodiments, augmented reality user device 104 comprises WiFi functionality. Such embodiments may involve augmented reality user device 104 resolving a SSID of a WiFi network (or access point) detected by the WiFi functionality of augmented reality user device 104. Augmented reality user device 104 then renders the virtual object in the augmented reality environment further on the basis of the resolved SSID.

According to embodiments, augmented reality user device 104 comprises an array of at least two radio frequency receivers and the receiving comprises receiving a plurality of signals at a plurality of radio frequency receivers in the array. The frequency receivers radio frequency receivers may be spaced relatively far apart in or on augmented reality user device 104 and/or may be arranged in a non co-linear configuration to enhance spatial resolution. For example, where the augmented reality user device 104 is in the form of a headset, two radio frequency receivers could be provided on the brow of the headset and another could be provided on the bridge of the nose part of the headset.

In some embodiments, performing the spatial resolution operation comprises identifying angles of arrival and received signal strengths of the received plurality of signals. The angle of arrival (for example measured via an array of receivers/antennas in the visor of the headset) is resolved to provide a direction/orientation. The signal strength on each receiver/antenna enables the distance to be resolved. It may be desirable, for example to have beacons with relatively few features or components compared to those in the user device. For example, the user device may comprise an array of multiple radio frequency receivers to identify angles of arrival and received signal strengths so that a single beacon emitting a single type of signal may be used.

In alternative embodiments, performing the spatial resolution operation comprises identifying angles of departure and received signal strengths of the received plurality of signals and/or identifying times of flight and received signal strengths of the received plurality of signals. In some embodiments, radio beacons may send out multiple signals at differing angles and/or vertical spacings in order to enable spatial resolution operations to be performed at augmented reality user device 104. In some embodiments, radio beacons may send out signals at differing polarizations in order to enable spatial resolution operations to be performed at augmented reality user device 104.

In embodiments, radio frequency signals are received from a plurality of radio frequency beacons at at least one radio frequency receiver of augmented reality user device 104. Spatial resolution operations and rendering of virtual objects may be performed in relation to a subset of the received signals, but not performed in relation to received signals not in the subset. Embodiments comprise performing a filtering operation on the plurality of received radio frequency signals according to one or more predetermined criteria to identify the subset of received signals. The one or more predetermined criteria may be user-configurable such that a user can choose which rendering(s) they would like to be exposed to and which they would not. Such embodiments can be particularly useful when there are a relatively high number of available objects to be rendered because overwhelming of the user by too many rendered objects can be avoided.

A blacklist of one or more virtual objects which are not to be rendered in an augmented reality environment on augmented reality user device 104 may be maintained by augmented reality user device 104. In such embodiments, augmented reality user device 104 inhibits rendering of a virtual object in an augmented reality environment on augmented reality user device 104 if the virtual object is on the maintained blacklist. One or more settings of the maintained blacklist may be user-configurable.

A whitelist of one or more virtual objects which can be rendered in an augmented reality environment on augmented reality user device 104 may be maintained by augmented reality user device 104. In such embodiments, augmented reality user device 104 inhibits rendering of a virtual object in an augmented reality environment on the augmented reality user device unless the virtual object is on the maintained whitelist. One or more settings of the maintained whitelist may be user-configurable.

In some examples, a default configuration is to render all virtual objects which could be rendered, with the user being able to blacklist virtual objects they do not wish to be rendered. In other examples, a default configuration is to render none of the virtual objects which could be rendered, with the user being able to whitelist virtual objects they wish to be rendered.

Embodiments comprise measures, for example methods, systems, processors and computer programs, for use in operating a radio frequency beacon. The radio frequency beacon generates at least one radio frequency signal which comprises data operable to assist an augmented reality user device in rendering a visual object in an augmented reality environment on an augmented reality user device. The radio frequency beacon transmits the at least one radio frequency signal to the augmented reality user device.

According to embodiments, the at least one radio frequency signal is operable to assist the augmented reality user device in performing a spatial resolution operation in relation to the at least one signal to determine a location of the radio frequency beacon.

In some embodiments, the data operable to assist an augmented reality user device comprises an identifier for the radio frequency beacon. In other embodiments, the data operable to assist an augmented reality user device comprises a network address for a database from which information for rendering the visual object in an augmented reality environment can be obtained.

Embodiments comprise measures, for example methods, systems, processors and computer programs, for use in operating a radio frequency beacon database. A radio frequency beacon identifier is received at the radio frequency beacon database from a simulated reality user device. Rendering information is retrieved from the database based at least on the received radio frequency beacon identifier. The retrieved rendering information is transmitted from the radio frequency beacon database for use by the simulated reality user device.

Embodiments comprise measures, for example methods, systems, processors and computer programs, for use in processing data for an augmented reality environment. A communication device receives at least one signal from a radio frequency beacon at at least one radio frequency receiver. The communication device performs a spatial resolution operation in relation to the at least one received signal to determine a location of the radio frequency beacon. On the basis of the determined location, the communication device generates rendering information for rendering a virtual object in an augmented reality environment, and causes transmittal of the generated rendering information to an augmented reality user device. In such embodiments, some of the data processing tasks are carried out by a communication device separate to the augmented reality user device instead of by the augmented reality user device itself. The communication device may for example comprise a set-top box, a games console, a smart television, or suchlike which is capable of communicating with the augmented reality user device either directly or via a network.

Embodiments comprise measures, for example methods, systems, processors and computer programs, for use in processing data for a virtual reality environment. A virtual reality user device receives video data from a plurality of video capture devices. The virtual reality user device processes the received video data to detect one or more objects in the received video data. The virtual reality user device performs a lookup in a network database to obtain information for rendering the one or more detected objects. The virtual reality user device renders the one or more objects in a virtual reality environment on the virtual reality user device at least on the basis of the received video data and the obtained rendering information.

In some such embodiments, performing the lookup in the network database comprises identifying any correlations between image data for the detected one or more objects in the received data and image data stored in the network database.

Some embodiments involve receiving information from one or more of a geographical location network service, a WiFi signal mapping network service, and one or more inertial sensors; in such embodiments, the network database lookup is performed on the basis of the received information.

In alternative embodiments, the location of virtual objects can be stored in a database, for example database 210 accessible via network 212. In such embodiments, rendering and orientation within the field of view can be achieved through image processing and indoor mapping techniques that enable augmented reality user device 104 to correlate images from its cameras to a database of images of the space that augmented reality user device 104 is currently in. Such embodiments may involve mapping indoor and/or outdoor spaces and providing fast (global) access to such mappings. The mappings can be updated periodically and/or continually to cope with changes in the layout of spaces.

Rendering the location of virtual objects can be achieved through enhancements in indoor and outdoor positioning technology (referred to as 'sensor fusion'). The combination of an outdoor position (for example obtained from a Global Navigation Satellite System (GNSS)) with indoor signal maps (for example obtained via WiFi), and/or the addition of dead reckoning from inertial sensors can be used to assist in determining the location and availability of virtual objects from a database.

The rendering location and/or the description of an object to be rendered can be contained in visual tags (or 'stickers') that are placed within the physical environment. Such embodiments may involve use of a line of sight from augmented reality user device 104.

Embodiments comprise measures, for example methods, systems, processors and computer programs, for use in processing data for a virtual reality environment. A virtual reality user device receives video data from a plurality of video capture devices. The virtual reality user device processes the received video data to detect one or more visual tags located in the physical environment of the virtual reality user device. On the basis of the one or more detected visual tags, the virtual reality user device obtains information for rendering one or more objects in a virtual reality environment. The virtual reality user device renders the one or more objects in a virtual reality environment on the virtual reality user device at least on the basis of the obtained rendering information.

According to embodiments, one or more devices comprise a processor or processing system. In embodiments, the processing system comprises one or more processors and/or memory. In embodiments, the processing system comprises one or more GPUs. Each device as described in relation to any of the embodiments described above may similarly comprise a processor and/or processing system. One or more of the aspects of the embodiments described herein with reference to the drawings comprise processes performed by augmented reality user device 104. In embodiments, augmented reality user device 104 comprises one or more processing systems or processors configured to carry out these processes, as depicted by element 105 in FIG. 1. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples. Further embodiments are envisaged.

Some embodiments are described above in relation to an augmented reality environment and other embodiments are described above in relation to a virtual reality environment. Such augmented reality environment embodiments can also be applied in a virtual reality environment and vice versa, or a combination of the two environments.

Some embodiments described above involve an augmented or virtual reality device in the form of a headset. Embodiments can equally be applied in other forms of augmented or virtual reality devices for example integral to a mobile telephone device, a tablet computing device, a watch, a helmet or suchlike.

In some embodiments, the augmented or virtual reality device comprises an audio interface but does not comprise a graphical user interface. For example, the augmented or virtual reality device may be in the form of a set of earphones, headphones or the like. In such embodiments, the augmented or virtual reality device may render one or more audio features of a virtual object in relation to a determined location in the augmented reality environment without rendering one or more visual features of the virtual object.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

What is claimed is:

1. A method of processing data for an augmented reality environment, the method comprising, at an augmented reality user device:

receiving at least one signal from a radio frequency beacon at at least one radio frequency receiver of the augmented reality user device;

performing a spatial resolution operation in relation to the at least one received signal to determine a location of the radio frequency beacon; and rendering one or more audio features of a virtual object in the augmented reality environment on the augmented reality user device at least on the basis of the determined location of the radio frequency beacon, wherein the method comprises transmitting a connection request to the radio frequency beacon, the connection request comprising a request to connect to the radio frequency beacon over a different type of connection from a connection over which the at least one signal is received from the radio frequency beacon and/or over which the connection request is transmitted to the radio frequency beacon.

2. The method of claim 1, wherein the augmented reality user device comprises a plurality of audio channel loudspeakers and rendering the one or more audio features comprises outputting a plurality of audio signals comprising differing spatial information via the plurality of audio channel loudspeakers, whereby a user of the augmented reality user device is able to determine a relative orientation of the virtual object by spatial audio perception.

3. The method of claim 1, wherein the different type of connection has a higher bandwidth than the connection over which the at least one signal is received from the radio frequency beacon and/or over which the connection request is transmitted to the radio frequency beacon.

4. The method of claim 1, wherein one or more visual features of the virtual object are rendered in association with the one or more audio features.

5. The method of claim 4, wherein the one or more audio features and the one or more visual features of the virtual object are rendered in association with a real object.

6. The method of claim 1, wherein the augmented reality device comprises a user interface for interacting with a real object via user input.

7. The method of claim 6, wherein the user interface is operable to change one or more settings of the real object via user input.

8. The method of claim 7, comprising:

obtaining a key based on data comprised in the received at least one signal; and using the key to enable the one or more settings of the real object to be changed.

9. The method of claim 6, wherein the user interface comprises a voice user interface.

10. The method of claim 6, wherein the user interface comprises a graphical user interface and wherein the augmented reality user device comprises a headset configurable to provide user input to the graphical user interface via eye-tracking functionality of the headset.

11. The method of claim 1, wherein the received at least one signal comprises real-time information from a local environment of a real object, the method comprising rendering the virtual object in the augmented reality environment further on the basis of the real-time information from the local environment of the real object.

12. The method of claim 1, comprising using a network address comprised in the received at least one signal to access rendering information at the network address, wherein the rendering is performed on the basis of the accessed rendering information.

13. The method of claim 1, wherein the augmented reality user device comprises an array of at least two radio frequency receivers and the receiving comprises receiving a plurality of signals at a plurality of radio frequency receivers in the array and wherein performing the spatial resolution operation comprises:
- identifying angles of arrival and received signal strengths of the received plurality of signals;
- identifying angles of departure and received signal strengths of the received plurality of signals; and/or
- identifying times of flight and received signal strengths of the received plurality of signals.

14. The method of claim 1, comprising:
- maintaining a blacklist of one or more virtual objects which are not to be rendered in an augmented reality environment on the augmented reality user device; and
- inhibiting rendering of a virtual object in an augmented reality environment on the augmented reality user device if the virtual object is on the maintained blacklist.

15. The method of claim 1, comprising:
- maintaining a whitelist of one or more virtual objects which are can be rendered in an augmented reality environment on the augmented reality user device; and
- inhibiting rendering of a virtual object in an augmented reality environment on the augmented reality user device unless the virtual object is on the maintained whitelist.

16. The method of claim 1, comprising:
- receiving signals from a plurality of radio frequency beacons at at least one radio frequency receiver of the augmented reality user device; and
- performing spatial resolution operations and rendering of virtual objects in relation to a subset of the received signals and not performing spatial resolution operations and rendering of virtual objects in relation to received signals not in the subset.

17. A system for use in processing data for an augmented reality environment, the system comprising:
- at least one memory including computer program code; and
- at least one processor in data communication with the at least one memory, wherein the at least one processor is configured to:
  - receive at least one signal from a radio frequency beacon at at least one radio frequency receiver of an augmented reality user device;
  - transmit a connection request to the radio frequency beacon, the connection request comprising a request to connect to the radio frequency beacon over a different type of connection from a connection over which the at least one signal is received from the radio frequency beacon and/or over which the connection request is transmitted to the radio frequency beacon;
  - perform a spatial resolution operation in relation to the at least one received signal to determine a location of the radio frequency beacon; and
  - render one or more audio features of a virtual object in the augmented reality environment on the augmented reality user device in relation to the determined location of the radio frequency beacon.

18. A non-transitory computer-readable storage medium comprising computer-executable instructions which, when executed by a processor, cause an augmented reality device to perform a method, the method comprising:
- receiving at least one signal from a radio frequency beacon at at least one radio frequency receiver of the augmented reality user device;
- performing a spatial resolution operation in relation to the at least one received signal to determine a location of the radio frequency beacon; and
- rendering one or more audio features of a virtual object in an augmented reality environment on the augmented reality user device at least on the basis of the determined location of the radio frequency beacon,
- wherein the method comprises transmitting a connection request to the radio frequency beacon, the connection request comprising a request to connect to the radio frequency beacon over a different type of connection from a connection over which the at least one signal is received from the radio frequency beacon and/or over which the connection request is transmitted to the radio frequency beacon.

* * * * *